Aug. 6, 1968 D. W. FLYGSTAD 3,396,245

MODE OF SIGNAL RESPONSIVE HEARING AID APPARATUS

Filed Dec. 9, 1964 2 Sheets-Sheet 1

INVENTOR.
DEAN W. FLYGSTAD
BY
Carlson, Carlson & Sturm
ATTORNEYS

MODE OF SIGNAL RESPONSIVE HEARING AID APPARATUS

Filed Dec. 9, 1964 2 Sheets-Sheet 2

INVENTOR.
DEAN W. FLYGSTAD
BY
Carlsen, Carlsen & Sturm
ATTORNEYS 3,396,245

MODE OF SIGNAL RESPONSIVE HEARING AID APPARATUS

Dean W. Flygstad, Roseville, Minn., assignor to The Telex Corporation, Tulsa, Okla., a corporation of Delaware Filed Dec. 9, 1964, Ser. No. 417,173
8 Claims. (Cl. 179—107)

ABSTRACT OF THE DISCLOSURE

Hearing aid apparatus that is responsive to the mode of transmission of a signal to selectively utilize electromagnetic or compressional wave mediums of transmission for further amplification to increase the magnitude of a signal for application to the auditory sense organs of a user.

This invention relates generally to hearing aids and is more particularly directed to hearing aids of the class adapted to be utilized in connection with a telephone receiver.

In the prior art with which my invention is concerned, hearing aids have been provided with various forms of inductance coils that are designed to respond to the alternating magnetic flux that is present around a telephone receiver when a suitable electrical signal is applied thereto. While it is possible to attain satisfactory transmission of the magnetic energy generated in a telephone receiver to appropriate signal amplifying and receiving devices in a hearing aid, the performance of such apparatus under normal operating conditions has not proven entirely satisfactory to the user of the hearing aid.

In all known forms of prior art apparatus, a means for disconnecting the usual microphone in a hearing aid to eliminate the effects of ambient compressional wave signals in a room and to connect the inductance coils to the amplifier of the hearing aid has been required. Further means may also be provided for adjusting the relative gain of the instrument in accordance with the mode of operation, i.e., using the microphone for normal hearing aid operation or the inductance coil for hearing aid operation with a telephone receiver.

In some instruments, the gain may be varied manually to adjust the sound level applied to the auditory canal of a user under the several modes of operation and, of course, this requires readjustment each time a change is made from one mode of operation to another mode of operation. In other apparatus, the gain of the instrument is changed in accordance with the switching means for changing modes of operation. Performance with this type of apparatus has not always been satisfactory due to a lack of uniform signal transfer between the telephone receiver and the inductance coil in the hearing aid instrument because of a lack of consistency in locating the telephone receiver with respect to the inductance coil.

Another problem that has arisen with hearing aid apparatus using prior art switching devices to transfer between modes of operation is that of the user's human frailty in forgetting to operate the switch device to place the apparatus in the mode of operation desired. This is particularly undesirable upon completion of a telephone conversation as the hearing aid apparatus will not be operative to provide the function for which it was designed. A great deal of unnecessary inconvenience to the user has resulted because of the apparent inoperativeness of the apparatus and the loss of time for unnecessary service calls and the like.

As will become apparent from a consideration of the drawings and detailed explanation set forth below, my invention provides an improved hearing aid instrument for use in a first normal mode of operation and in a second telephone signal receiving mode of operation in which switching means, operable to selectively connect a microphone or an inductance coil to the amplifier in the instrument, are provided to automatically respond to the presence and location of a telephone receiver in signal transferring relationship to the hearing aid instrument.

It may be seen that my invention provides for automatic switching between the two modes of operation of the hearing aid instrument whereby the user need merely place a telephone receiver in signal transferring relationship with his hearing aid instrument and will receive an indication of the mode of operation of his instrument whereby he may easily determine the proper mode of operation and, upon removal of the telephone receiver, the hearing aid instrument will automatically change to the normal state, or mode of operation.

It is therefore an object of my invention to provide a novel and improved hearing aid apparatus having two modes of operation.

A further object of my invention is to provide a novel and improved hearing aid apparatus which provides automatic changing between modes of operation.

Another object of my invention is to provide a novel and improved hearing aid apparatus having a first normal mode of operation and a second mode of operation for use with a telephone receiver.

A further object of my invention is to provide improved means in hearing aid apparatus for use in receiving telephone signals and the like.

A still further object of my invention is to provide automatic switching means responsive to a telephone receiver for improving the signal transferring characteristics from the telephone receiver to output signal utilization means.

A still further object of my invention is to provide automatic switching means for connecting signal amplifying means to a telephone receiver which provides improved efficiency of operation.

These and other objects of my invention will become apparent from a consideration of the appended specification, claims and drawings, in which—

Figures 1, 2, 3, 4, 6:
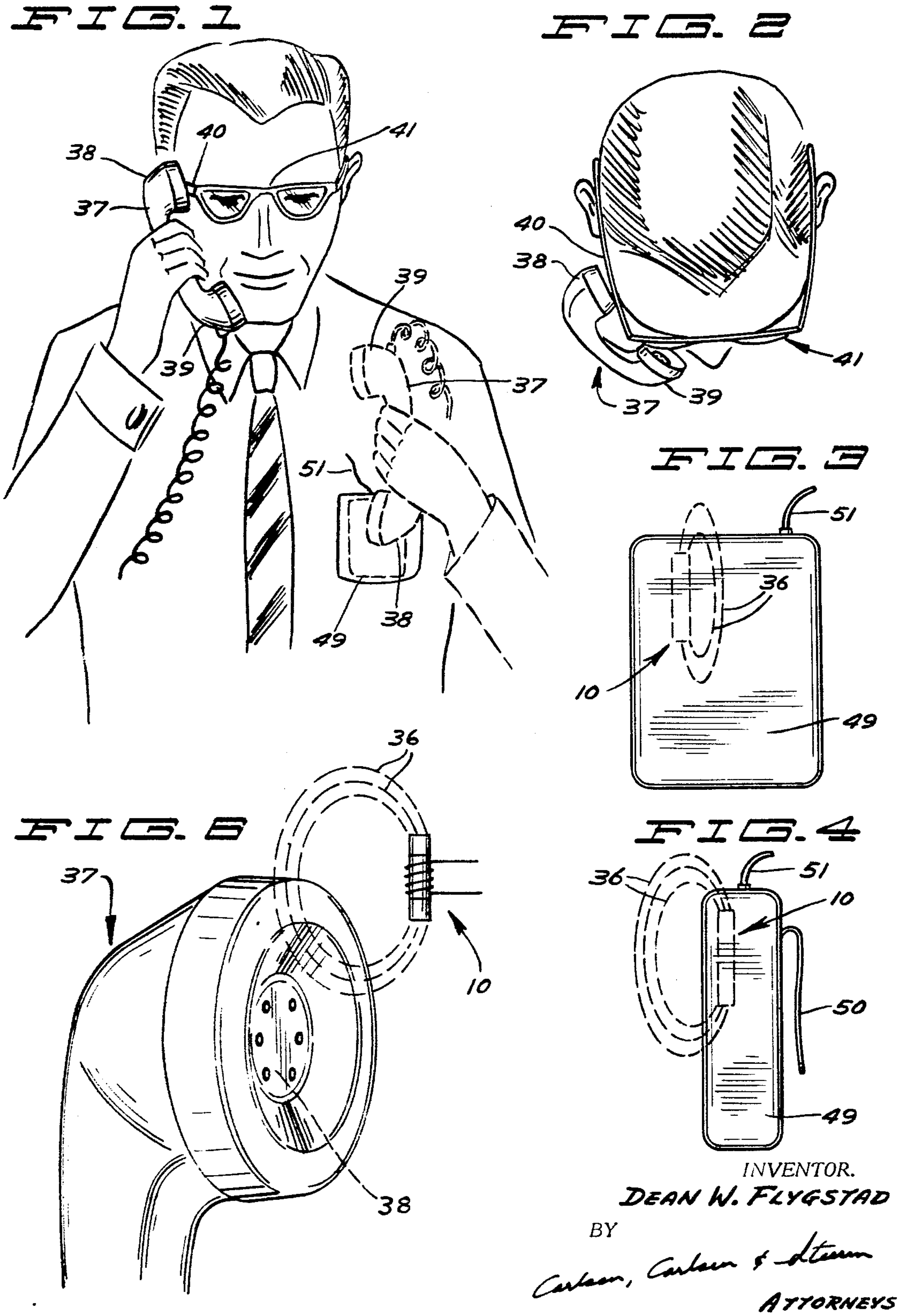
FIGS. 1 and 2 are diagrammatic sketches of a person and apparatus embodying the principles of my invention illustrating the general environment in which my invention may be utilized.
FIGS. 3 and 4 are front and side views respectively of a body worn type hearing aid apparatus to which the principles of my invention have been applied.
FIG. 6 is a perspective sketch of the receiver portion of a telephone handset illustrating the relationship of a portion of my invention with the magnetic energy fields present in proximity to a telephone receiver.

Referring now to the drawings in which like reference characters have been applied to like devices and apparatus in the several views, FIGS. 1 and 2 are illustrative of the general environment in which my invention may be operative.

In FIGS. 1 and 2, a telephone handset 37, comprised of a transmitter, or microphone 39 and a receiver 38 is shown disposed in one of two positions about the body of a person. Microphone 39 is shown disposed in sound receiving relationship to the oral cavity, or mouth of the person and receiver 38 is shown disposed in proximity to a templar member 40 of an eyeglass type of hearing aid 41 or in proximity to a body worn type of hearing aid indicated by reference character 49. A pair of conductors, indicated generally by reference character 51, are shown extending from body worn hearing aid 49 for connection to a suitable receiver for providing a signal to the auditory sense organs of the person. Devices for accomplishing this function are well known to those skilled in the art and may include, for example, a source of compressional wave energy to be inserted in the auditory canal of the person or a bone conduction receiver.

FIGS. 3 and 4 illustrate further general details of the body worn type of hearing aid apparatus 49 which includes a clip 50 for maintaining the same at the desired location on the body of a user. A magnetic energy responsive switching means is indicated generally by reference character 10 and is shown in phantom outline to indicate that switching means 10 is disposed entirely within the housing for body worn hearing aid apparatus 49. The general form of magnetic energy that exists in proximity to a telephone receiver is indicated generally by reference character 36 and is shown, in relation to switching means 10, in the relative disposition which will result in operation of the hearing aid apparatus in a telephone signal receiving mode of operation.

Figure 5:
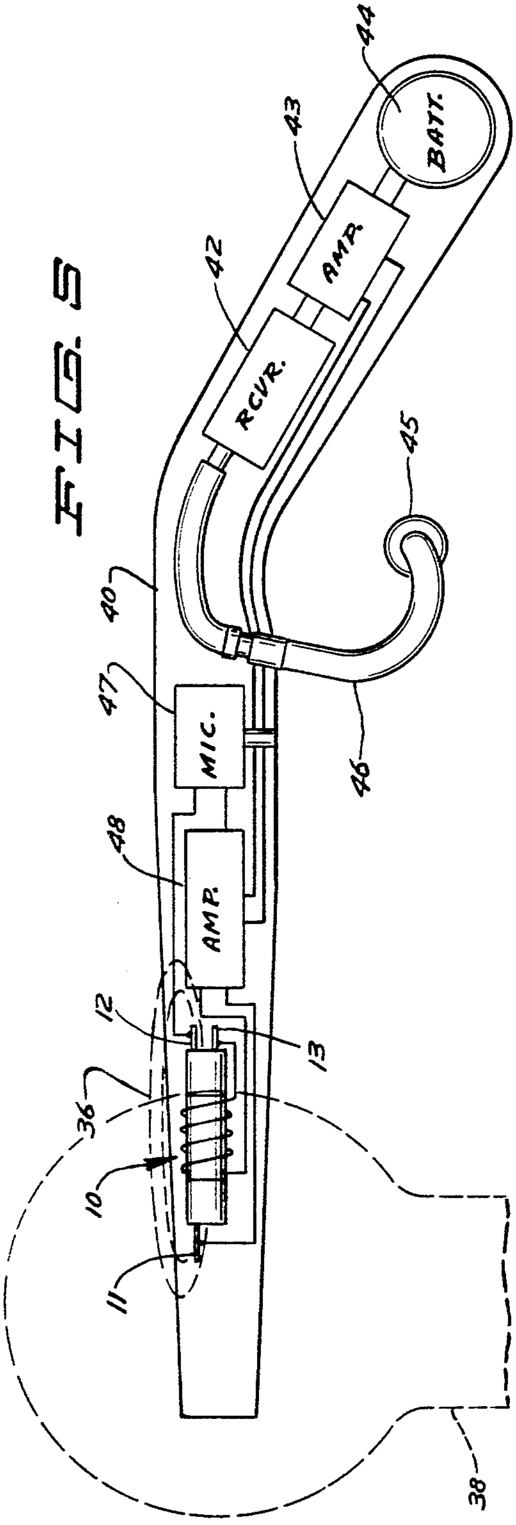
FIG. 5 is a side elevation schematic and diagrammatic view of an eyeglass type hearing aid comprising a single templar member embodying the principles of my invention in a typical application.

In FIG. 5 a templar member 40 comprised of a hollow housing is shown partly broken away to illustrate a receiver 42 that is connected to an ear piece 45 adapted to be inserted into the auditory canal of a user through suitable tubing means 46, an amplifier 43 connected through suitable conductors to energize receiver 42, a microphone 47 and an inductance coil 29 adapted to be connected to an amplifier 48 through switching means 10 and a battery 44 suitably connected to amplifiers 43 and 48. Microphone 47 is provided with a downwardly extending tube which extends through the housing defined by templar member 40 for reception of compressional wave energy from outside of templar member 40. Coil winding 29 is shown disposed on switching means 10 which includes a movable contact 11 connected to amplifier 48 and a pair of stationary contacts 12 and 13 connected to microphone 47 and inductance coil 29 respectively. A telephone receiver 38 is shown in phantom outline in proximity to switching means 10 and the magnetic field present in telephone receiver is indicated generally by reference character 36.

In FIG. 6 a typical telephone handset 37 is shown having a receiver 38 as indicated in dotted outline. Receiver 38 includes a source of magnetic energy that provides a substantially toroidal shaped field of flux lines indicated generally by reference character 36. Switching means 10 is shown disposed in magnetic energy receiving relationship therewith and, in the position shown, switching means 10 may be operative to place a hearing aid instrument, or the like, in a telephone signal receiving mode of operation, namely that of having an inductance coil winding connected to amplifier means contained therein and providing disconnection of the normally connected microphone provided therein or provided for use therewith.

Figure 7:
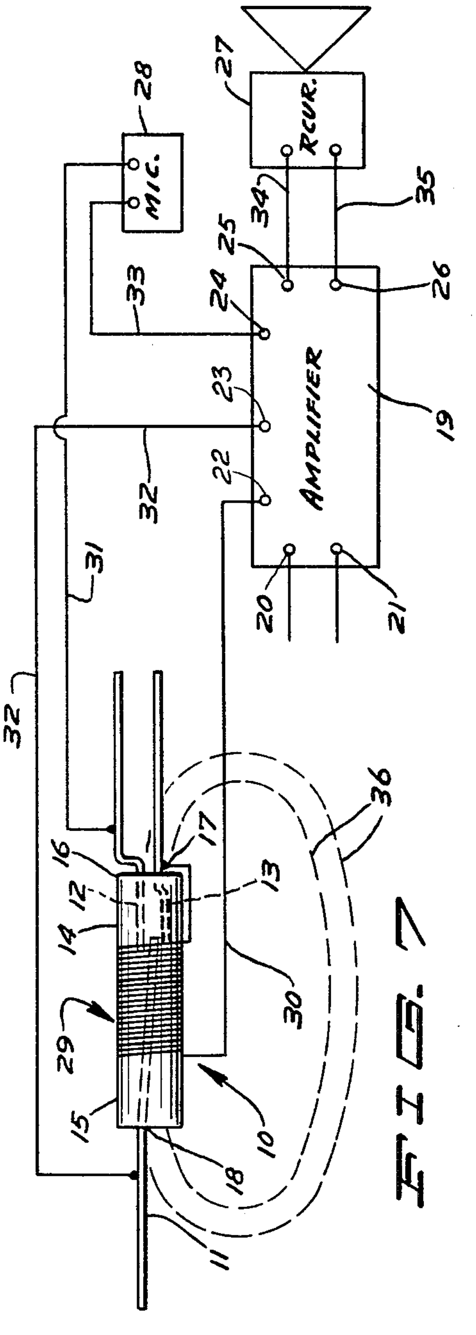
FIG. 7 is a schematic and diagrammatic sketch of a typical hearing aid to which the principles of my invention have been applied.

In FIG. 7, switching means 10 is shown having a movable contact 11 which is comprised of an elognated magnetically permeable reed type member and a pair of stationary contacts 12 and 13 disposed in operative engageable relationship therewith to provide a single pole double throw switching operation upon movement of movable contact 11 from conductive engagement with, for instance, contact 12 to contact 13. As indicated in dotted outline, movable contact 11 and stationary contacts 12 and 13 may be operable within a suitable enclosure therefor, for example, a sealed tubular glass housing. In FIG. 7, a pair of end caps 15 and 16, comprised of suitable magnetically permeable materials, are shown disposed on each end of switching means 10 and may be suitably connected to movable contact 11 and stationary contact 13 by magnetic paint indicated generally by reference characters 18 and 17 respectively. An inductive coil winding

29 is shown disposed on switching means 10 and may be comprised of a plurality of turns of suitably insulated conductive wire. FIG. 7 also includes a receiver 27, an amplifier 19 having a pair of terminals 20 and 21 adapted for connection to a suitable source of electrical energy, a pair of output terminals 25 and 26, input terminals 22, 23 and 24, and a microphone 28. Receiver 27 is shown connected to output terminals 25 and 26 on amplifier 19 through conductors 34 and 35 respectively. Input terminal 23 on amplifier 19 is shown connected to movable contact 11 on switching means 10 through conductor 32. Microphone 28 is shown connected to stationary contact 12 through conductor 31 and to input terminal 24 through conductor 33. Coil winding 29 is shown connected to stationary contact 13 and to input terminal 22 on amplifier 19 through conductor 30. Switching means 10 is shown disposed in magnetic energy receiving relationship with magnetic flux field 36.

*Operation*

In operation, in the absence of a magnetic field in proximity to switching means 10, movable contact 11 is disposed in conductive relationship with stationary contact 12 to provide a normal mode of operation in which microphone 47, for example, is connected to amplifier 48 to provide an output from receiver 42 in response to compressional wave energy present in a given area. The same operation may be seen on FIG. 7 in which microphone 28 would normally be connected to amplifier 19 to provide an output from receiver 27 in a normal mode of operation.

At such time as the user of the hearing aid apparatus, and the like, desires to utilize a telephone, the placing of the receiver, as indicated by reference character 38, in proximity to switching means 10 automatically, through the influence of magnetic flux field 36, provides conductive contact between movable contact 11 and stationary contact 13 on switching means 10 to connect coil winding 29 in signal transferring relationship with amplifier 48 (FIG. 5) or amplifier 19 (FIG. 7). At such time, microphone 47 or microphone 28 is disconnected from the input of amplifier 48 or amplifier 19 and coil winding 29 is responsive to the alternating flux field normally present in proximity to receiver 38 in telephone handset 37.

The disposition of coil winding 29 in a fixed predetermined relationship with switching means 10 may serve to prevent operation of the hearing aid apparatus, and the like, in the telephone signal receiving mode of operation until such time as receiver 38 is in a desired positional relationship with coil winding 29 to provide the most efficient transfer of signal energy thereto.

It may be noted that the "magnetic reed switch" utilized in the illustrated embodiment of my invention may be provided with the magnetic end caps 15 and 16 illustrated on FIG. 7 of the drawings to increase its sensitivity to the presence of the magnetic field, such as that indicated by reference character 36, to increase responsiveness thereto.

It may be noted that switching between a first, normal mode of operation of the hearing aid apparatus, and the like, and the second telephone signal receiving mode of operation is entirely automatic and is not dependent upon any manual action by the user of the apparatus. It further does not require the use of a switching means that extends through the housing in which the hearing aid apparatus, and the like, is disposed.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A hearing aid for use in combination with a magnetic telephone receiver comprising in combination; amplifier means having input terminals and output terminals; a microphone; a coil winding; switching means responsive to magnetic energy for selectively connecting said microphone and said coil winding to the input terminals of said amplifier means; receiver means connected to the output terminals of said amplifier means; said amplifier means, microphone, coil winding, switching means and said receiver means being disposed in a housing adapted to be worn on the body of a user whereby said microphone is normally connected to the input terminals of said amplifier means and said coil winding is connected to the input terminals of said amplifier means in response to the presence of a magnetic receiver in energy transferring relationship to said switch means.

2. The apparatus of claim 1 in which the coil winding is disposed in predetermined relationship with the switching means.

3. Hearing aid apparatus for use in combination with a magnetic telephone receiver comprising in combination; amplifying means, said amplifynig means including input and output terminals; a receiver connected to the output terminals of said amplifying means; inductive means; switching means responsive to the presence of magnetic energy to connect said inductance to the input terminals of said amplifying means, said amplifying means, said receiver, said inductance and said switching means being disposed in a housing and said switching means being operable in response to the proximity of the receiver in a telephone to connect said inductance means to said amplifier means whereby a signal in said telephone receiver may be amplified for the convenience of a user.

4. The apparatus of claim 3 in which the inductance means is disposed in predetermined relationship with the switching means whereby the inductance means is in signal transferring relationship with the telephone receiver when the switching means is operative to connect the inductance means to the input terminals of the amplifier means.

5. The apparatus of claim 1 in which the coil winding is disposed on the switching means and is connected to at least one contact on said switching means.

6. The apparatus of claim 1 in which the coil winding is disposed on the switching means.

7. The apparatus of claim 6 in which magnetically permeable material is disposed on the switching means.

8. The apparatus of claim 1 in which magnetically permeable material is disposed on the switching means.

References Cited

UNITED STATES PATENTS

| | | | |
|---|---|---|---|
| 2,530,621 | 11/1950 | Lybarger | 179—107 |
| 2,686,844 | 8/1954 | Brewer | 179—159 |

KATHLEEN H. CLAFFY, *Primary Examiner.*

A. A. McGILL, *Assistant Examiner.*